May 22, 1934.  A. VON WANGENHEIM  1,959,698
LUBRICATOR
Filed Nov. 26, 1927    8 Sheets-Sheet 1

Inventor
Adolf von Wangenheim
By his Attorney

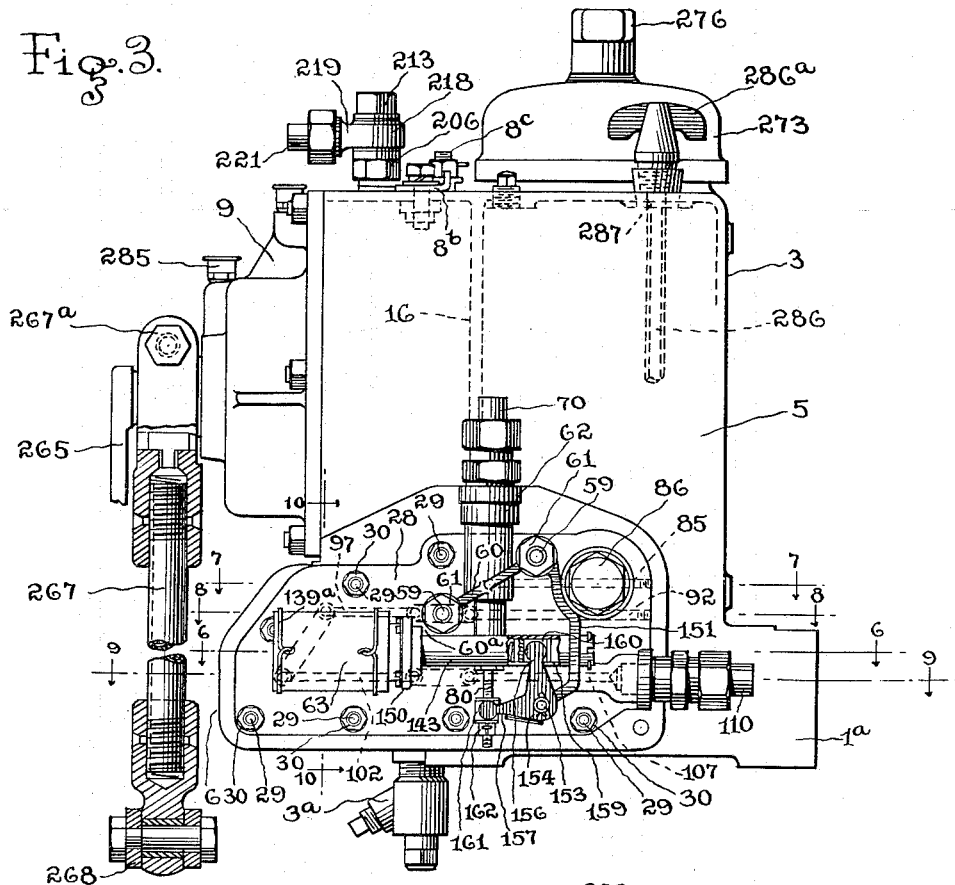
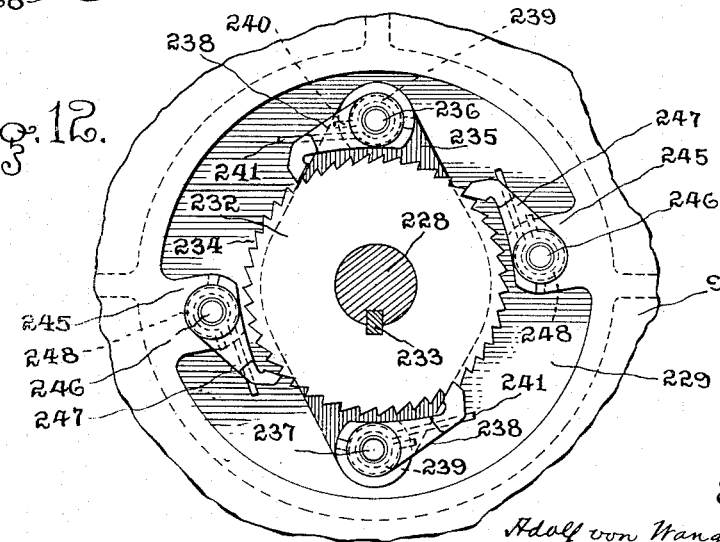

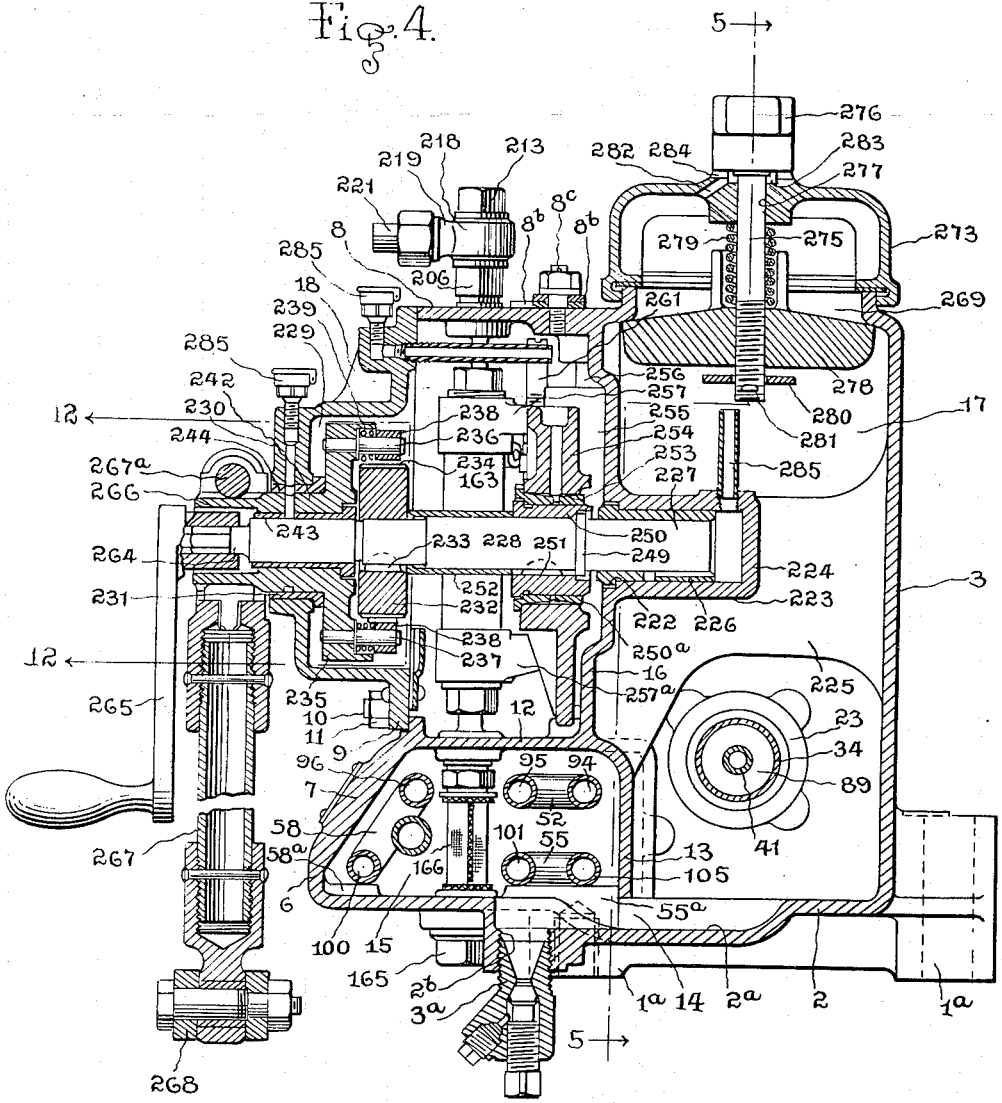

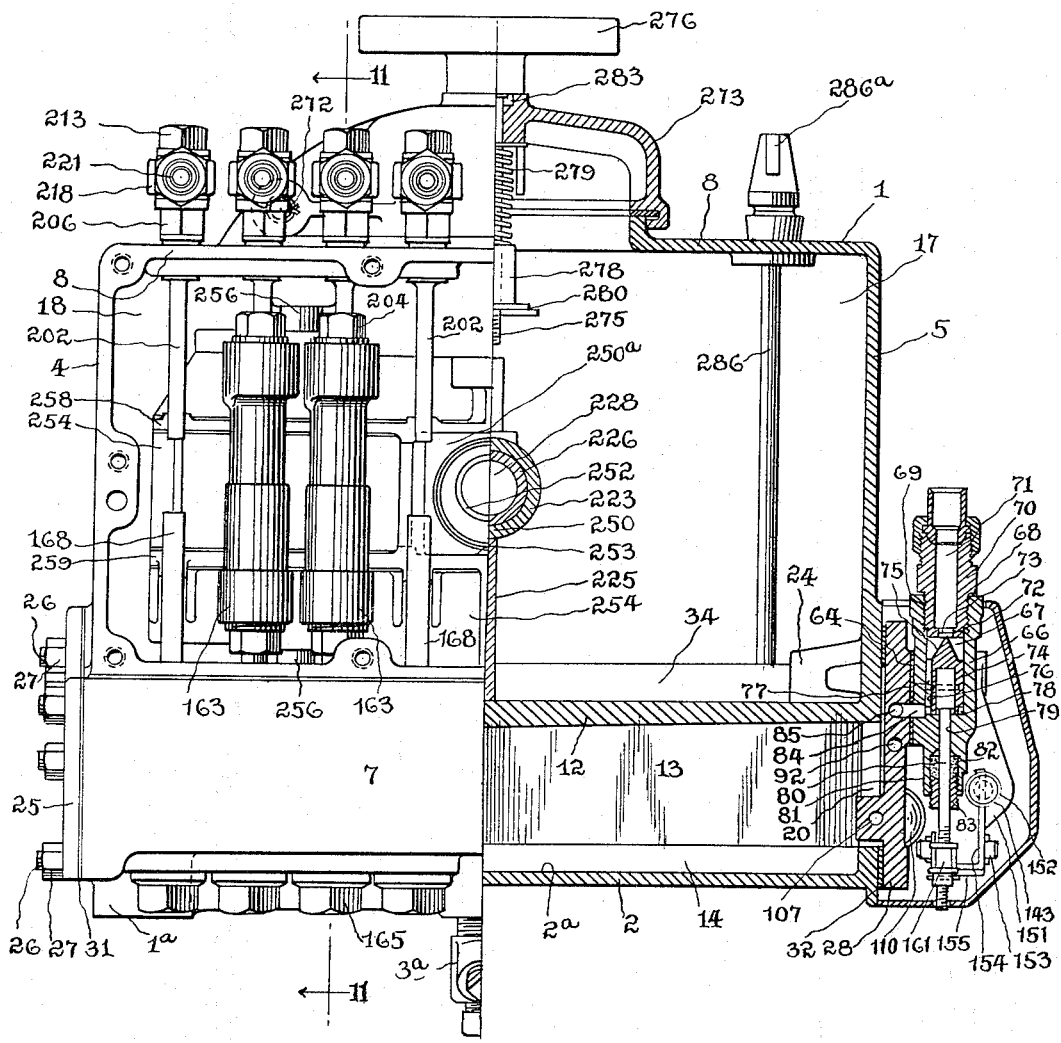

May 22, 1934.  A. VON WANGENHEIM  1,959,698
LUBRICATOR
Filed Nov. 26, 1927   8 Sheets-Sheet 5
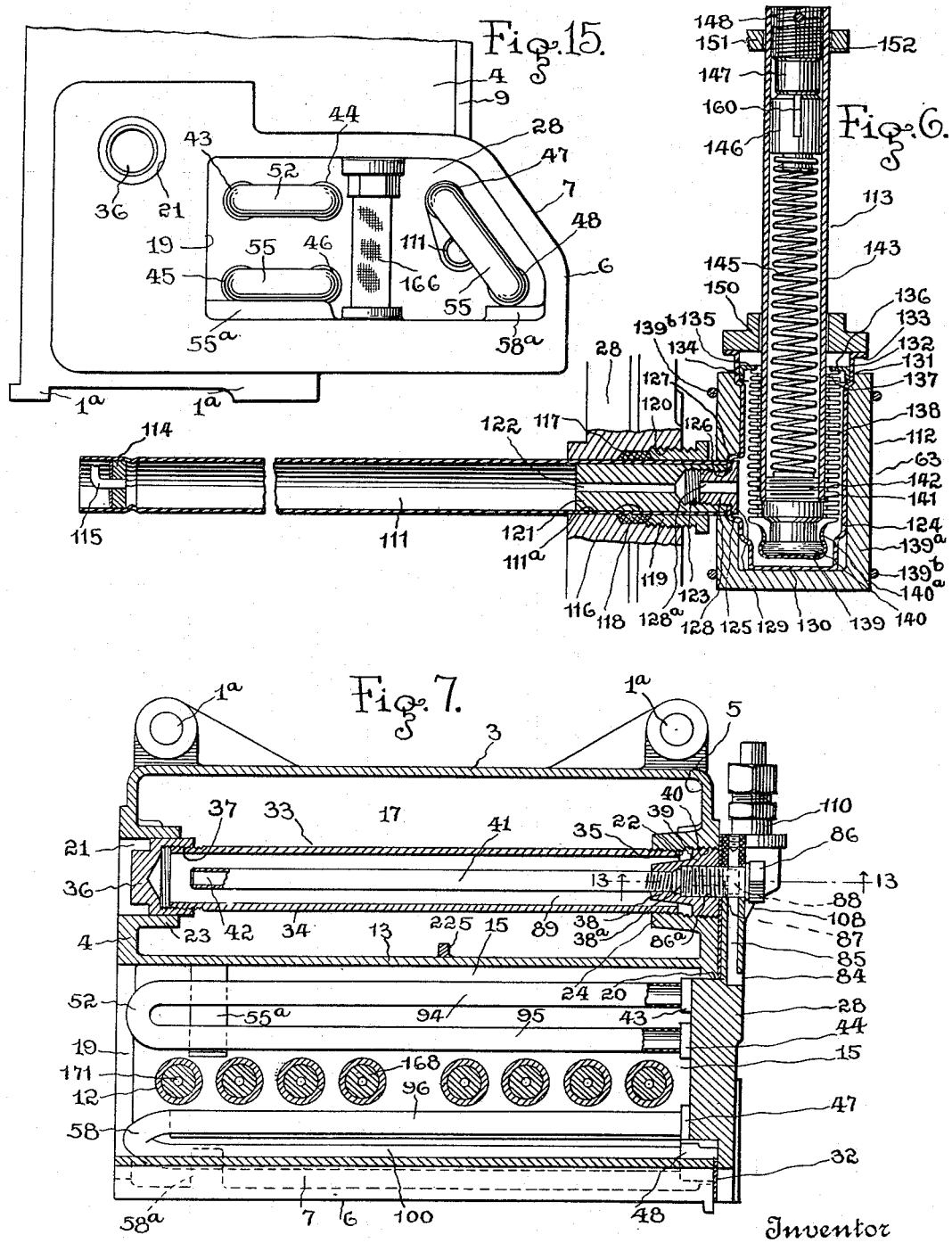
Inventor
Adolf von Wangenheim
By his Attorney

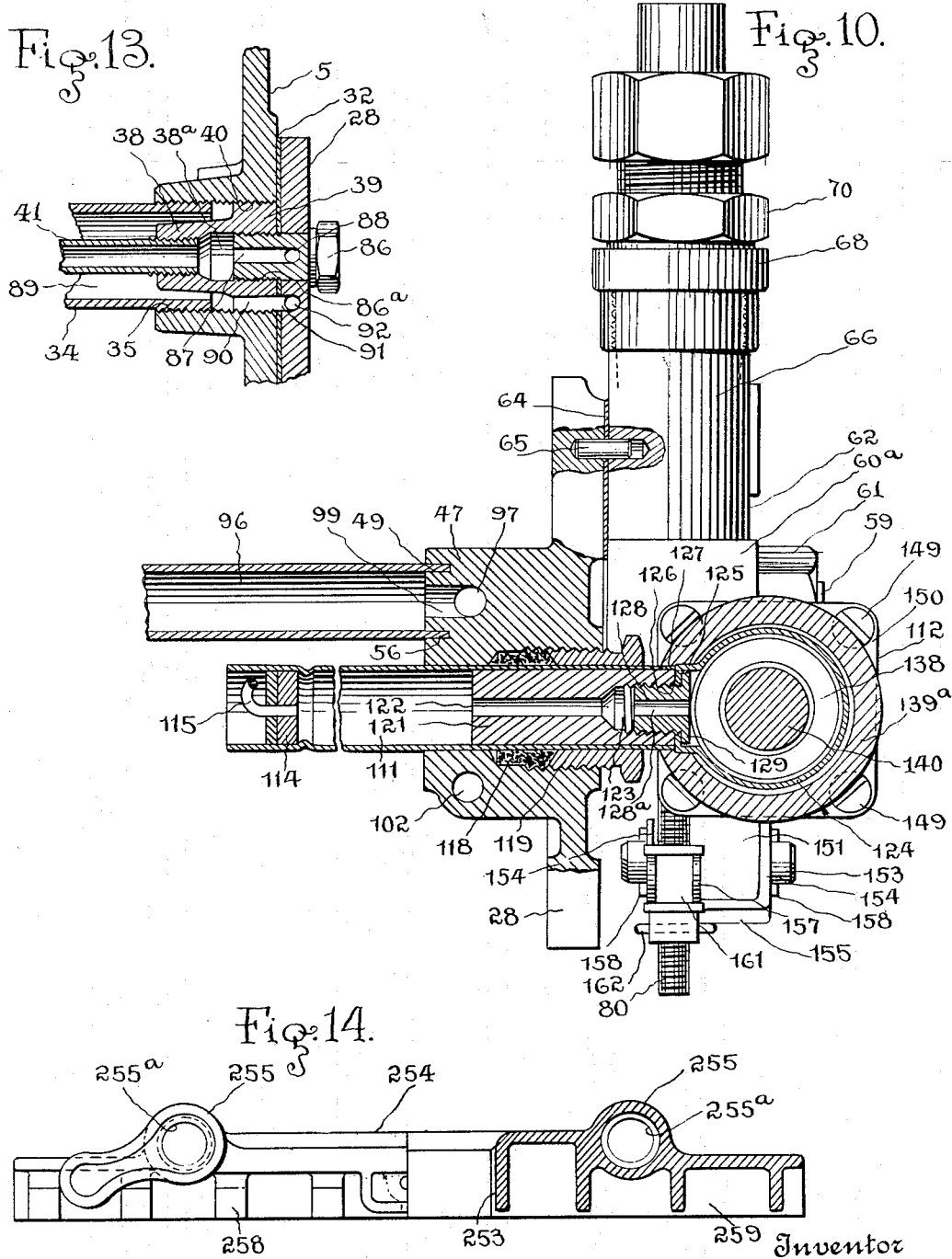

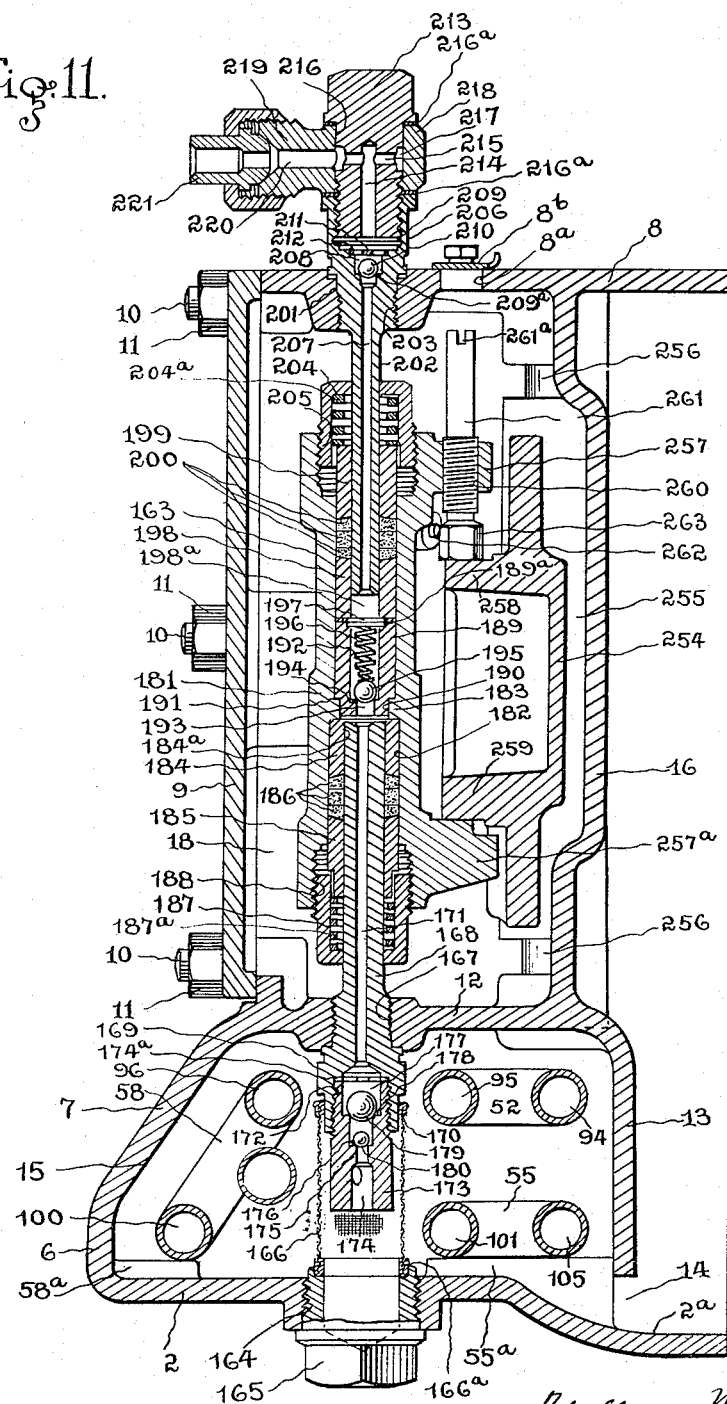

Patented May 22, 1934

1,959,698

UNITED STATES PATENT OFFICE 1,959,698

LUBRICATOR

Adolf von Wangenheim, Detroit, Mich., assignor to Detroit Lubricator Company, Detroit, Mich., a corporation of Michigan Application November 26, 1927, Serial No. 235,839

20 Claims. (Cl. 184—104)

My invention relates to new and useful improvements in lubricators, and more particularly to a mechanical lubricator or oiler of the force feed type adapted for application to a locomotive or other engine which may be exposed to atmospheric changes of temperature.

An object of my invention is to construct a lubricator which will be efficient in operation.

Another object is to provide a lubricator which will feed oil at the rate for which it is set without being subject to changes in rate due to variations in the viscosity of the oil normally resulting from atmospheric changes of temperature.

Still another object is to provide a lubricator in which the working parts are easily accessible and are readily removable for cleaning, repair or replacement.

The invention consists in the improved construction and combination of parts, to be more fully described hereinafter, and the novelty of which will be particularly pointed out and distinctly claimed.

In the accompanying drawings, to be taken as a part of these specifications, I have fully and clearly illustrated a preferred embodiment of my invention, in which drawings—

Fig. 3 is a side view partially in section and also having the valve mechanism enclosing cover removed;

Fig. 4 is a vertical central section on the line 4—4 of Fig. 1;

Fig. 5 is a front elevation in half section on the line 5—5 of Fig. 4, having the front cover plate and certain of the pump cylinders removed;

Fig. 6 is a detail sectional view on line 6—6 of Fig. 3;

Fig. 7 is a detail sectional view on line 7—7 of Fig. 3;

Fig. 10 is a detail sectional view on line 10—10 of Fig. 3;

Fig. 11 is a detail sectional view on line 11—11 of Fig. 5;

Fig. 12 is a detail sectional view on line 12—12 of Fig. 4;

Fig. 13 is a detail sectional view on line 13—13 of Fig. 7;

Fig. 14 is a detail plan view of the pump actuating member and half shown in horizontal central section, and Fig. 15 is a partial end elevation looking from the left toward the right of Fig. 7.

Figure 1:
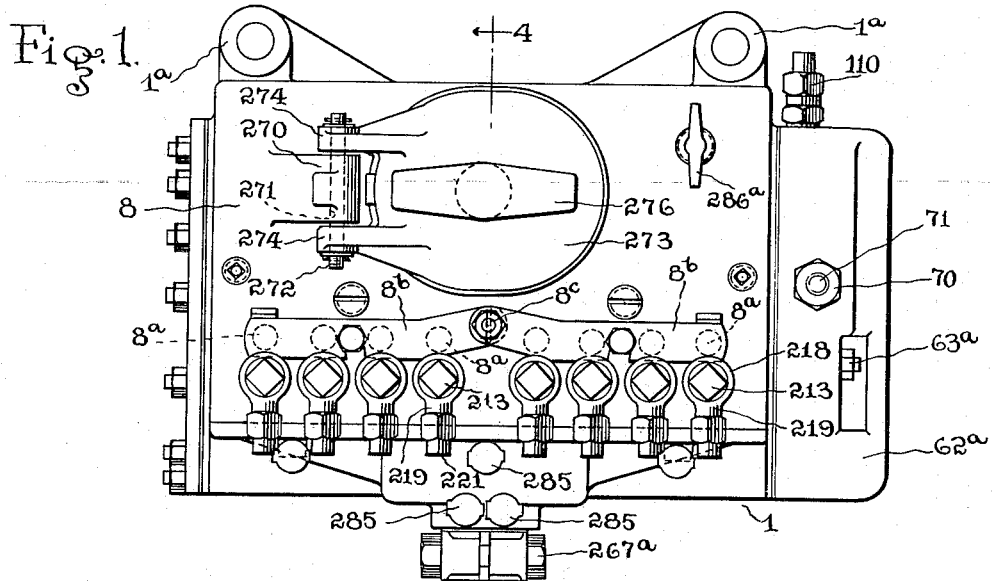
Figure 1 is a top plan view of a lubricator embodying my invention.

Referring to the drawings by characters of reference, 1 designates, generally, the casing of a lubricator of the force feed type constructed to deliver oil or other lubricant under pressure to predetermined working parts of a locomotive or other mechanism. The casing 1 is substantially rectangular, having a base or bottom wall 2 from which rise vertically a back wall 3, side or end walls 4, 5, and a front wall 6, which is inclined upwardly and inwardly a short distance above the base 2, as at 7, and terminates at substantially one-third the height of the back and side walls. The back and side walls are capped by a top wall 8, and the open front of the casing above the front wall 6 is closed by a cover plate 9 which is secured at suitable points to the side, top and front walls by studs 10 screwed into the casing, and by nuts 11. In the base or bottom wall 2 is an elongated basin 2ª, which preferably extends to the end walls 4, 5. At the top of the front wall 6 (see Fig. 4), a partition 12 extends longitudinally from end to end of the casing 1, and also extends into the casing to substantially half its depth in a plane substantially parallel to the base 2. A wall 13 depends from the free edge of partition 12 and terminates substantially in the plane of the base 2 but above the basin 2ª so as to provide a flow passage 14 through the basin 2ª from the interior of the casing 1 into the space or chamber 15 which is divided from the remaining interior of the casing by the partition 12 and the wall 13. The casing 1 is further divided internally by a vertical wall 16 which extends from end to end of the casing joining the side walls 4, 5, and from the partition 12 near the top of wall 13 to the top wall 8. The space within the casing between the walls 13, 16 and the back wall 3 provides a main reservoir or storage chamber 17, while the space in front of the walls 13, 16 and closed by cover 9 comprises a pump chamber 18. The chamber 15 opens through the side walls 4, 5, as at 19, 20, and the reservoir 17 also opens through the side or end walls 4, 5, substantially in the vertical center line of reservoir 17, and also substantially in the plane of partition 12, as at 21, 22 (see Fig. 7), these openings 21, 22 having inwardly extending surrounding flanges or bosses 23, 24, respectively. The openings 19, 21 are closed by an end plate 25 (Fig. 5) which is secured to the end wall 4 by studs 26 screwed into the wall 4 and by nuts 27. The opposite openings 20 and 22 are closed by an end plate 28 which is secured to the end wall 5 by studs 29 screwed into wall 5 and by nuts 30 (see Fig. 3). Between each end plate 25, 28 and the wall to which it is fixed, I preferably place gaskets 31, 32 to tightly seal the joints and prevent leakage of oil from the casing 1. On the casing are a plurality of lugs 1$^a$ for fastening the lubricator to any desired support. Through the wall 2 of the basin 2$^a$ is an opening 2$^b$ in which is threaded a drain plug 3$^a$ (see Fig. 4) which may be opened to drain the interior of the casing 1 and particularly the chambers 15 and 17, or to drain sediment from the basin 2$^a$.

Within the main reservoir 17 is a heating element 33 (see particularly Fig. 7), which includes preferably an outer tube 34 which is tightly threaded at one end, as at 35, into the flange or nipple 24 and at its opposite free end receives a closure and sealing cap 36 which is preferably threaded thereon, as at 37. The cap 36 extends into the annular flange 23 and has a free, sliding fit therein to permit expansion and contraction of tube 34. Extending into the tube 34 is a sleeve 38 of smaller diameter than tube 34 having a bore 38$^a$ and a circumferential threaded flange 39 which engages internal threads 40 in opening 22, the outer end of the sleeve being flush with the outer face of wall 5. Supported by the sleeve 38 and preferably threaded into bore 38$^a$ is a tube 41 which is of smaller diameter than and extends substantially for the length of the tube 34 and which is open at its free end 42.

Figure 8:
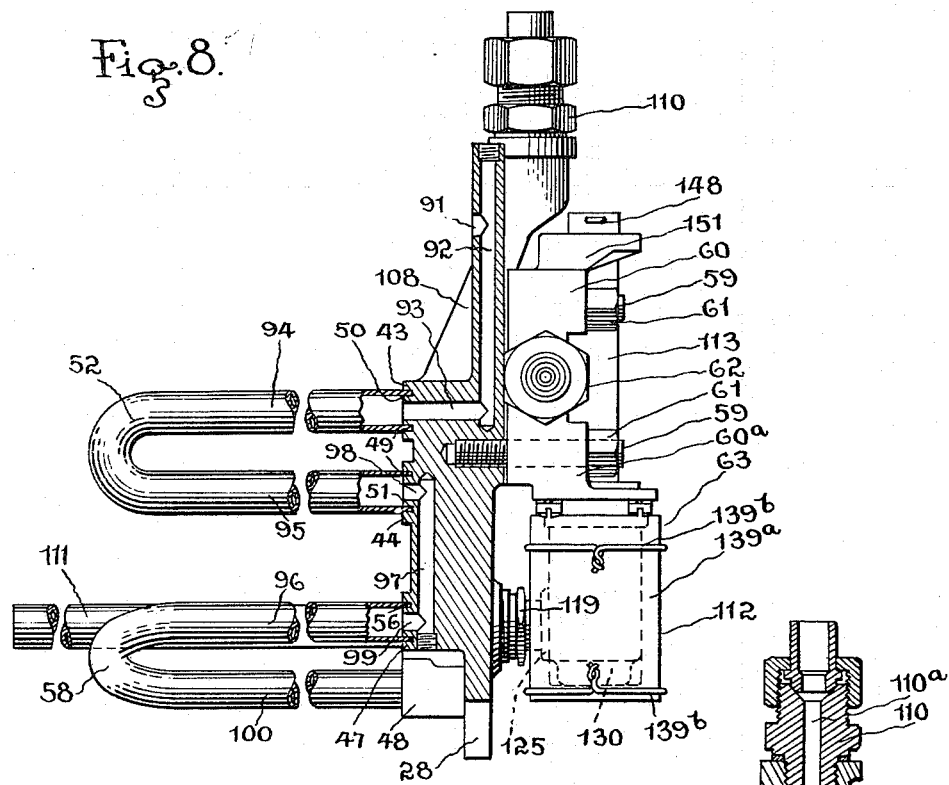
Fig. 8 is a detail view, partially in section, on line 8—8 of Fig. 3.
Figure 9:
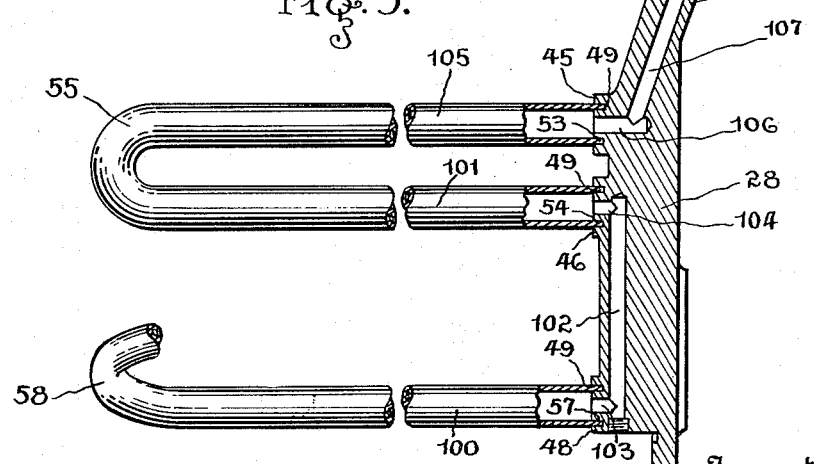
Fig. 9 is a detail sectional view on line 9—9 of Fig. 3.

On the inner face of the plate 28 (see Fig. 15) and projecting into chamber 15 through opening 20 is a plurality of pairs of spaced bosses, designated 43 and 44, 45 and 46, and 47 and 48. The pairs of bosses 43, 44 and 45, 46 are in substantially parallel horizontal planes and in vertical alinement, while boss 47 is in the horizontal plane of bosses 43, 44, and boss 48 is in horizontal plane of bosses 45, 46, both bosses 47, 48 also being in an inclined plane substantially parallel to the inclined portion 7 of the front wall 6 of the casing 1. Each of said bosses has an annular socket 49 (see Figs. 8, 9, 10). In the sockets 49 of bosses 43, 44 are respectively secured and sealed the opposite ends 50, 51 of a heating tube 52, preferably in the form of a loop. In the sockets 49 of the bosses 45, 46 are respectively secured and sealed the opposite ends 53, 54 of another heating tube or loop 55. In the sockets 49 of the bosses 47, 48 are respectively secured and sealed the opposite ends 56, 57 of another or third heating tube or loop 58. These loops 52, 55 and 58 are all of substantially equal length and extend through the chamber 15, terminating in or adjacent to the opening 19, but not contacting the plate 25, so that the loops may be free to expand longitudinally. In the chamber 15 are supports 55$^a$ and 58$^a$, which are preferably integral with base 2 and on which the loops 55 and 58 respectively rest.

Mounted on studs 59 threaded into and projecting from the outer face of end plate 28 (see Fig. 3), are supporting members 60, 60$^a$ which are clamped to plate 28 by nuts 61 threaded on the studs 59. Carried by the members 60, 60$^a$ are a valve means 62 and a thermostatic valve control mechanism 63, which are encased by a cover 62$^a$ secured to the wall 5 by studs and nuts 63$^a$.

The valve means 62 is positioned vertically on the casing 1 and in lateral engagement with the plate 28 to which it is preferably sealed by a gasket 64, and further secured by means of a pin 65 (Fig. 10). Referring to Fig. 5, the valve means includes a casing 66, preferably cylindrical, which is hollow or chambered for a portion of its length, as at 67, from its upper end or top 68 which is open. Adjacent its top 68 the casing 66 is internally threaded, as at 69, to receive a connecting fitting 70 having an internal longitudinal bore 71 and adapted to be connected to a source of heating agent such as steam. The inner end of the fitting 70 which is within the casing 66 has its bore 71 restricted by an internal annular shoulder 72 providing a valve port 73. Within the chamber 67 is a valve member 74 having a valve head proper 75, preferably conical, which is adapted to seat on shoulder 72 to close port 73, and having a flat side or sides 76 below the conical end 75 to provide a passage or passages 77 to the lower end 78 of chamber 67. The valve member 74 is fitted within chamber 67 for free longitudinal reciprocation so as to guide the valve 75 to its seat. Through the base 78 of the casing 66 is a guideway 79 through which slidably projects a valve stem 80 which is secured suitably to the valve member 74. On the casing 66 is a depending annular flange or sleeve 81 which serves as a packing gland and surrounds the valve stem to receive suitable packing 82 to seal the guideway 79. A packing nut 83 is threaded into the sleeve 81 to secure the packing 82 tightly in the gland.

From the lower end 78 of the inlet chamber 67, a passage 84 leads through casing 66 into the plate 28, where it communicates with a longitudinal passage 85 (Fig. 7) in plate 28, which intersects the axial line of tube 41 located in reservoir 17. Through the plate 28 in the axial line of tube 41, I pass a bolt 86 which is threaded, as at 86$^a$, into the bore 38$^a$ of sleeve 38 (see Figs. 7 and 13). This bolt 86 has a longitudinal passage 87 which opens into bore 38$^a$ and terminates in the line of passage 85 where it opens into a transverse passage 88 in the bolt for communication with passage 85. From the annular space 89 between outer tube 34 and the tube 41, is a port 90 through the flange 39 which registers with a port 91 in plate 28 (Fig. 13), with a communicating longitudinal passage 92 therein. From the passage 92 which terminates substantially midway of the length of plate 28, a passage 93 leads through boss 43 into one leg 94 of the loop 52. The other leg 95 of this loop 52 is in communication with the leg 96 of loop 58 by means of a passage 97 in plate 28 which opens at its opposite ends through ports 98, 99, in bosses 44, 47, into the respective legs 95, 96. The other leg 100 of loop 58 is in communication with leg 101 of loop 55 by means of a passage 102 (Fig. 9) in plate 28 and substantially parallel to passage 97, the passage 102 opening at its opposite ends through ports 103, 104, in bosses 48, 46 into the respective legs 100, 101. From the remaining leg 105 of loop 55 is a port 106 through boss 45 which opens into an outlet passage 107 which leads through a conduit member 108 carried by the plate 28. At the free end of passage 107 and of the conduit member 108, is an internally threaded socket 109 in which may be threaded a connecting member 110 having a hollow bore 110a for exhaust of the heating agent. From the foregoing description it is evident that these heater loops or tubes 52, 58, 55 are connected in series relation, but it is of course understood that they may be connected in parallel relation if desired.

The thermostatic valve control means 63 extends longitudinally of the plate 28 and includes (see Fig. 6) a bulb 111, an expansion chamber 112, and a plunger means 113. The bulb 111 which is preferably in the form of a tube, extends through an opening 111a in the end plate 28, and into and for substantially the length of the chamber 15 beneath the leg 96 of heating loop 58, but above the plane of loop 55. At its free end the tube 111 is closed and sealed by a plug 114 through which is a filling tube 115. Surrounding the fixed end 116 of the tube 111, is an annular recess or packing gland 117 in plate 28 which opens through the outer face of the plate 28. In the recess 117 is a suitable packing medium 118 which is compressed and held therein to prevent leakage around tube 111 by a packing nut 119, preferably threaded into the recess 117, as at 120. Within the tube 111 at its fixed end 116, which projects beyond the outer face of plate 28, is a plug 121 having a hollow bore 122, bore 122 being enlarged and internally threaded at its outer end, as at 123. To this projecting end of tube 111 I connect the expansion chamber 112, which includes a substantially cylindrical casing 124 having a boss 125 on its side wall, which is preferably formed from the metal of the casing 124. Through boss 125 is an aperture 126 leaving a surrounding flange 127. From the inside of casing 124, a bolt or screw 128 having a longitudinal bore 128a, is passed through aperture 126 and threaded tightly into the enlarged bore 122 of plug 121 at 123, and with the head 129 of the bolt engaging the inner face of flange 127, thus sealing the bulb 111 to the casing 124. One end of the casing 124 is closed and sealed by an end wall 130, and adjacent its other end there is an internal outwardly facing shoulder 131 beyond which the casing 124 continues for a short distance to form a band 132 which terminates in a lateral surrounding flange 133. Seated on the shoulder 131 and sealed to the band 132 is a ring 134 which has an annular lateral projecting flange 135. Secured and sealed, as by solder or the like, to the inner periphery of this flange 135, as at 136, is one end 137 of an expansible-collapsible element 138, preferably in the form of a substantially cylindrical, circumferentially corrugated, metallic bellows, which extends into casing 124 and has a head 139 closing its free end. The head 139 of bellows 138 is adjacent to but spaced from the end wall 130 of casing 124 to permit free longitudinal expansion of the bellows 138 within the casing. The expansion chamber 112 is preferably insulated by suitable insulating material 139a enclosing the casing 124 and secured thereon by straps 139b. The plunger means 113 has a post 140 which seats against and is secured to the inner face of the bellows head 139, preferably by spinning the bellows head 139 about post 140, as at 149a. The post 140 has an outwardly facing shoulder 141 beyond which the post is threaded, as at 142. Engaging the threads 142 and abutting the shoulder 141 is one end of a tube 143 which extends through the bellows 138, and the annular flange 135 and to a point beyond the inlet valve means 62 (see Fig. 3). Within the tube 143 is an overtravel safety means which includes a spring 145, preferably of the coil type, one end of which abuts the post 140 and the other end of which contacts a follower member or block 146 which is preferably cylindrical to fit slidably within the tube 143 to be guided thereby. The free end of tube 143 is closed by a plug or abutment 147 threaded thereinto and held by a cotter-pin 148 passing through the tube and the plug. The spring 145 is held under compression in the tube by the plug 147 so that member 146 is normally held against plug 147. The flange 133 on casing 124 is secured by screws 149, or the like, to a collar 150 which surrounds tube 143 but through which the tube may slide freely and which is preferably integral with the supporting member 60a. From the member 60 an arm 151 depends (see Figs. 3, 5 and 10), and is provided with a guide aperture 152 for the free end of tube 143. This arm 151 extends below the tube 143 and has a bearing pin opening therethrough to receive a pin 153. Journalled on this pin are the substantially parallel arms 154 of a yoke 155, from which extend lever arms 156, 157 forming a lever of the bell-crank type. The arms 154 are secured on the bearing pin 152 by cotter-pins 158, or the like, which are passed through the bearing pin. The free end of the lever arm 156 extends through a longitudinal slot 159 in tube 143 and fits into a vertical slot 160 in the follower 146. The free end of lever arm 157 is bifurcated and terminates on opposite sides of a collar 161 adjustably threaded onto the free end of valve stem 80 and secured thereon by a cotter-pin 162, or the like.

In the pump chamber 18 (see Figs. 4, 5 and 11), are a plurality of alined and laterally spaced pumps 163 positioned in a common vertical plane and which are of similar construction, and therefore a detailed description of one of the pumps 163 will suffice for all. Any desired number of pumps may be employed, depending on the number of feed lines with which the lubricator is equipped. The pumps employed are substantially such as are shown and described in the patent issued to Frank A. Goodfellow, No. 1,369,422, Feb. 22, 1921, but the same have been modified and improved. Through the base 2 in a vertical plane between the heater loops 52 and 58 is an aperture 164 which is closed by a removable screw plug 165 which supports a filter medium 166, preferably a substantially cylindrical screen of fine wire mesh. By unscrewing the plug 165 the strainer 166 which is fixed thereto, as by burnishing at 166a, may be removed for cleaning or inspection. Directly above the aperture 164 is an internally threaded aperture 167 through the partition 12 into which is threaded a fixed pump plunger 168 which extends upward into the pump chamber 18 and at its lower end has a head 169 which fits tightly into the upper end of the strainer 166, as at 170. Longitudinally through the plunger 168 is a hollow bore 171 which opens at its lower end into an internally threaded recess 172 in the head 169, and which serves as a conduit for feeding oil to the pump from the heating chamber 15. Into the recess 172 is screwed one end of a hollow plug 173 having a longitudinal passage 174 therethrough, the passage 174 being constricted at 175 to provide a valve seat 176, and enlarged at 177 to provide a second valve seat 178. Valves 179, 180, preferably of the ball check type, are provided which cooperate with the seats 178, 176, respectively, and open upward to permit flow from chamber 15 through passage 174 to passage or bore 171. These valves are retained in the bore or passage 174 by a spider 174ª. Mounted on the plunger 168 for longitudinal reciprocation is a pump cylinder or header 181 having a longitudinal bore 182 therethrough and an internal annular flange 183 therein substantially midway of the length of the header. Within the bore 182 in surrounding sliding engagement with the plunger 168 are spaced guide sleeves 184, 185 between which and around the plunger 168 are placed packing rings 186 of any suitable packing material. These rings 186 are compressed axially and expanded radially to prevent escape of oil between the sleeves and plunger by a coil spring 187ª which surrounds plunger 168 and seats upon sleeve 185, and which is held under compression thereagainst by a hollow externally threaded packing nut 187 threaded into the bore 182, as at 188, and which caps the spring 187ª. Within the bore 182 is a valve member 189 which is of reduced cross-section at its lower end 190 to fit within the flange 183, the reduction forming a peripheral shoulder 191 which seats on the flange 183 and supports the member 189. Longitudinally through member 189 is a bore 192 which is constricted, as at 193, to provide an internal valve seat 194 for cooperation with a valve 195, preferably of the ball check type, which opens upward against a coil spring 196 held under compression against the valve 195, to normally seat the same, by a spider 197, which is preferably secured to member 189 by burnishing, as at 189ª. Above the spider 197 and within bore 182 are spaced guide sleeves 198, 199 between the adjacent ends of which are packing rings 200. Through the top wall 8 of the casing 1 in vertical axial alinement with the plunger 168 is an internally threaded opening 201 which receives a pump plunger 202 which is threaded tightly into the opening 201, as at 203. The plunger 202 extends downward into the bore 182 of the reciprocable cylinder 181 for internal sliding contact with the sleeves 198, 199 and packing rings 200. A hollow externally threaded packing nut 204 surrounds the plunger 202 and is threaded into the bore 182 of cylinder 181, as at 205. This hollow packing nut 204 caps and acts through a coil spring 204ª seated on sleeve 199 and surrounding plunger 202 to compress the packing rings 200 between sleeves 198 and 199 and to maintain valve member 189 against flange 183. The cross-sectional area of this plunger is substantially one-half the cross-sectional area of plunger 168, so that oil will be delivered by the pump and fed to the feed lines on both the up and the down stroke of the pump cylinder 181, as will more clearly appear from the description of the operation of the lubricator. External to the casing 1 the plunger 202 has a head 206 and longitudinally through the plunger is an internal bore 207 which is enlarged at its upper end, as at 208, the enlargement 208 opening into an internally threaded recess 209 in the head 206. Within the enlargement 208 is an annular upwardly facing shoulder 209ª which serves as a valve seat for cooperation with a valve 210, preferably of the ball check type which opens upwardly. The valve 210 is retained in the enlargement 208 by a spider, or the like, 211 secured in the side walls of the enlargement, as at 212. Threaded into the recess 209 is a plug 213 having a longitudinal bore 214 communicating with the enlargement 209 and with a transverse passage 215 through the plug 213. Surrounding the plug 213 in the horizontal plane of passage 215 is an annular bearing recess 216, in which is a circumferential groove 217 communicating with passage 215. Journalled in the recess 216 for rotation about plug 213, is a ring 218 having an extension 219. Suitable gaskets 216ª may be employed to prevent leakage between the ring 218 and the plug 213. Through the extension 219 is a passage 220 communicating with the groove 217 and terminating in a hollow nipple 221 for connection to a feed line or conduit (not shown) for delivery of lubricant to the engine working parts.

The pump chamber 18 also contains the pump-actuating mechanism (see Fig. 4). Through the wall 16 at substantially its mid-point is an opening 222, and preferably integral with wall 16 and extending into reservoir 17 in alinement with opening 222 is a bearing support member 223 which may be in the form of a hollow cylinder having an end wall 224. A reinforcing and supporting rib or plate 225 is provided in reservoir 17 to support member 223 and is preferably formed integral with member 223 and the walls 16 and 3. Within the member 223 is a bearing sleeve 226, and journalled therein is one end 227 of a shaft 228. The front cover 9 has a ratchet compartment or chamber 229 which opens into chamber 18 and is preferably cylindrical, having its axis in the longitudinal center line of the shaft 228. Through the end wall 230 of this chamber 229 is an aperture 231 through which shaft 228 projects. In the compartment 229 is a ratchet wheel 232 which is keyed to the shaft, as at 233, and has its teeth 234 set to drive the shaft in a clockwise direction when looking from the left of Fig. 4 (see Fig. 12). Journalled on the shaft 228 within compartment 229 is a ratchet plate 235 which extends beyond the circumference of wheel 232, and has diametrically opposite pins 236, 237 secured therein and projecting over the teeth 234. Pivoted on each pin 236, 237 is a drive pawl 238 which is normally pressed into engagement with the ratchet teeth by spring member 239, preferably of the coil type, each having one end 240 engaging the plate 235, and its other end 241 bearing against the pawl. Extending from and integral with the plate 235 is a sleeve 242 which projects through aperture 231 for a purpose to be described. Between the sleeve 242 and the shaft 228 is a bearing bushing 243, and a second bearing bushing 244 is secured in aperture 231 as a bearing for sleeve 242. In the compartment 229 and preferably integral with the side walls thereof, are oppositely disposed lugs 245, and from each lug a pin 246 projects across the face of wheel 232. Pivoted on each pin 246 is a stop pawl 247 which is normally pressed into engagement with the ratchet teeth 234 by a spring 248, in a manner similar to drive pawls 238. On the shaft 228 adjacent the wall 16 is a circumferential flange or abutment 249, and against this flange 249 is positioned an eccentric or cam 250 which is keyed to the shaft, as at 251, and held in longitudinal position thereon by a spacer sleeve 252 which abuts the ratchet wheel 232. The eccentric 250 is journalled in an eccentric slide block 250ª which is in sliding contact with the upper and lower faces of a rectangular slide opening 253 in a pump-actuating member 254 which is preferably in the form of a substantially rectangular plate. At each end of the plate 254 is a vertical guide sleeve 255 having a longitudinal bore 255ᵃ therethrough (see Fig. 14), by means of which the plate is mounted on guide posts 256 for vertical reciprocation in response to rotation of the eccentric 250. These posts 256 are secured in the chamber 13 and are fixed at their upper and lower ends respectively to the top wall 8 and to the partition 12. At the top and bottom ends respectively of each pump cylinder 181 are laterally extending arms 257, 257ᵃ. On the plate 255 are substantially parallel horizontal ribs or flanges 258, 259 which lie between the arms 257, 257ᵃ, and are adapted to engage the arms to move the cylinders 181. The arms 257, 257ᵃ are spaced apart a greater distance than the flanges 258, 259 to permit the plate 254 to move vertically independently of or without imparting movement to the cylinders or headers 181. Through each arm 257 above the flange 258 is an internally threaded hole 260 to receive an adjusting screw 261 which is locked in adjusted position by a spring pressed detent 262 engaging the head 263 of the screw 261 and carried by each cylinder 181. When the head 263 of the screw 261 is in engagement with flange 258 and arm 257ᵃ is in engagement with flange 259, the pump cylinder will move with and to the same extent as the plate 254. However, if the screw 261 is raised from the flange 258 when arm 257ᵃ is in engagement with flange 259, then upon movement of the plate 254 there will be lost motion between the plate 254 and the cylinder, depending on the spacing of screw head 263 from flange 258 when the arm 257 is in engagement with flange 259. The amount of lost motion between the plate and the cylinder determines the rate of delivery of the pump, and therefore the quantity of lubricant delivered per unit of time is dependent upon the adjustment of screw 261 which is kerfed at its top, as at 261ᵃ, for screw driver engagement. Directly above each screw 261 is an opening 8ᵃ in the top wall 8 through which the end of a screw driver, or other suitable tool, may be inserted to adjust the screws 261. The openings or holes 8ᵃ are closed by a pair of slide plates 8ᵇ which are pivoted at one end to swing on a common bolt 8ᶜ threaded into wall 8. This pump adjustment is not of my invention, having been described merely to complete the description as an operating whole of the force feed lubricator in which it is embodied.

The free end of the drive shaft 228 which extends through cover 9 is of decreased diameter, as at 264, within sleeve 242 to receive a crank 265 fixed thereto for manual rotation of the shaft 228 independently of the ratchet and for reciprocation of the pump cylinders 181. The end 266 of the sleeve 242 has fixed thereto a lever 267 by means of a bolt 267ᵃ, and is adapted to be oscillated by a push rod 268 which may be connected to a moving part of the engine or mechanism such as a cross-head, or the like.

Through the top wall 8 of the casing 1 is an oval or elliptical filling opening 269 which opens into the reservoir 17. Adjacent opening 269 is a boss 270 on the top wall 8, having an opening 271 therethrough for a bearing pin 272. The opening 269 is closed by a cover 273 having spaced arms 274 which are journalled on the bearing pin 272. A bolt 275 having a hand grip 276 is passed through an aperture 277 in the cover 273, and threaded on the bolt 275 is a cross-bar 278. Between the cover 273 and the cross-bar 278 and surrounding the bolt 275, is a coil spring 279. A washer 280 secured on the end of the bolt 275 by a cotter-pin 281, or the like, prevents loss of the cross-bar from the bolt. The cross-bar 278 is of such length that it will pass through opening 269 when turned into the major axis of the opening, but will engage the top wall 8 at the sides of the hole 269 when turned into the minor axis thereof, as in Fig. 4. Through the cover is an air vent 282 which opens from the reservoir 17 into an annular recess 283 in the cover and beneath the handle 276. From the recess 283 transverse air passages 284 communicate with the atmosphere. It is evident that this improved air vent will prevent the passage of dirt or other foreign matter into the reservoir 17 while maintaining a free air passage.

The working parts of the force feed mechanism are lubricated by means of grease or oil cups 285 positioned at advantageous points on or in the casing 1.

A gauge 286, preferably in the form of a rod having a hand grip 286ᵃ, may be employed to determine the quantity of oil in reservoir 17. This gauge rod 286 is inserted through an opening 287 in the top wall 8, and is secured therein by threaded engagement of the upper end of the rod 286 with internal threads in opening 287.

The lubricating device may be mounted in a variety of places, as on the engine frame, for example, and having been secured in position by means of bolts or screws engaging the lugs 1ᵃ and with the push rod 268 connected to a movable member such as the engine cross-head (not shown), the steam inlet nipple 70 is connected by suitable piping to a source of live steam, as the steam drum of the boiler (not shown), and from the steam outlet nipple 110 a suitable conduit (not shown) may lead to the ash pan or between the truck wheels of the locomotive; the oil feed nipples 221 are connected by suitable tubing or pipes (not shown) to the various points or parts of the engine which it is desired to positively lubricate, as the valves and cylinders. The terminals of the oil feed tubes may be provided with suitable terminal check valves.

The filling opening cover 273 is removed by revolving hand grip 276 to unscrew cross-bar 278, which when loose may be turned into the major axis of opening 269 to permit it being drawn through the opening as the cap or cover 273 is swung back on its hinge 272. Oil or other lubricant is then placed in the chamber 15 and storage reservoir 17 through the filling opening 269, after which the cover is closed and locked by the cross-bar 278, the spring 279 preventing the cross-bar from jarring loose.

When the device has been coupled up and filled with lubricant, as above described, it is ready for operation. Live steam from the source of supply will enter nipple 71, pass through the valve port 73 to passages 77 around the valve body 74 and into the longitudinal passage 85 in plate 28, by means of passage 84. Flowing through passage 85, the steam will enter tube 41 through the connecting passages 88, 87 in bolt 86. As the steam issues from end 42 of tube 41, it will be confined in tube 34 and flow back along tube 41 in space 89 to port 90 in plug 33, thus the lubricant in reservoir 17 will be heated and maintained fluid by conduction of heat from the steam through the outer tube 34. However, it is not desired to maintain this great volume of lubricant in chamber 17 at the viscosity at which it is fed to the working parts of the engine, as the radiation of heat from this main body of lubricant through the casing 1 would be so rapid as to render the heating unit and the lubricator inefficient, and therefore the oil heating chamber 15 is employed which is fed from the reservoir 17 through passage 14. The chamber 15 is of relatively small capacity, and due to the wall 13 prevents the hot oil from rising to the surface of chamber 17 so that the small body of high temperature oil is retained in chamber 15. The steam issuing from port 90 flows into passage 92 through port 91 (Fig. 8), whence it flows through loop 52, passage 97, loop 58, passage 102 (Fig. 9), loop 55, and outlet passage 107 to nipple 110 and the discharge conduit, above described. The steam passing through these loops 52, 58 and 55 successively will efficiently and quickly heat the oil confined in the small chamber 15. When the temperature of the oil in chamber 15 rises to the desired point above any possible rise of atmospheric temperature and at which the oil or lubricant has the proper viscosity to maintain a constant predetermined flow to the engine working parts, the thermostat control mechanism 63 will function to cut off the steam admitted to the heater. The heat of the oil in chamber 15 will expand the fluid, such as kerosene, in the bulb 111, and the expanded fluid passing through the hollow boss 125 into casing 124 will collapse the expansible-collapsible element 138. The force exerted by the expanded fluid in collapsing the bellows 138 will be transmitted through the bellows head 139 to slide the tube 143 from the left to the right of Fig. 3 carrying with it the spring 145 and member 146. This movement of member 146 will act on arm 156 of the bell crank lever to turn it in a clockwise direction of Fig. 3 and raise arm 157 which, being in engagement with collar 161, will positively lift valve stem 80 to move valve 75 to its seat to close the steam inlet port 73. It will be noted that the valve is moved by motion transmitted through the spring 145 and member 146, and independently of the tube 143, due to the longitudinal slot 159 in the underside thereof. By employing this actuating means the valve is positively seated without jamming, as the spring 145 will compress and permit overtravel of the plunger tube 143 after the valve is seated, thus also providing a safety means, preventing possible injury to the bellows 138 which would result if a rigid push rod were used instead of a resilient one as embodied in spring 145. After the valve 75 has been closed, the temperature of the oil surrounding bulb 111 will continue to rise until all the heat has been absorbed from the steam inside the loops 52, 58, 55, with the continued expansion of kerosene, resulting in a further collapse of the bellows, which extra movement is absorbed by spring 145. When the oil or lubricant in chamber 15 cools slightly, the fluid in bulb 111 will contract and the steam pressure acting against valve head 75 will cause the valve to open to again permit passage of steam through the heating element 33 and the heating loops 52, 58, 55 in the chambers 17 and 15 respectively to maintain the oil at the desired viscosity. The thermostat mechanism 63 will act within narrow temperature limits to open and close valve port 73, so that the temperature and therefore the viscosity of the oil or lubricant is kept substantially constant. Closing of the valve 75 may be regulated by adjusting the position of the collar 161 on the valve stem 80, and therefore the length of travel of the valve stem in response to collapse of the bellows 138.

Figure 2:
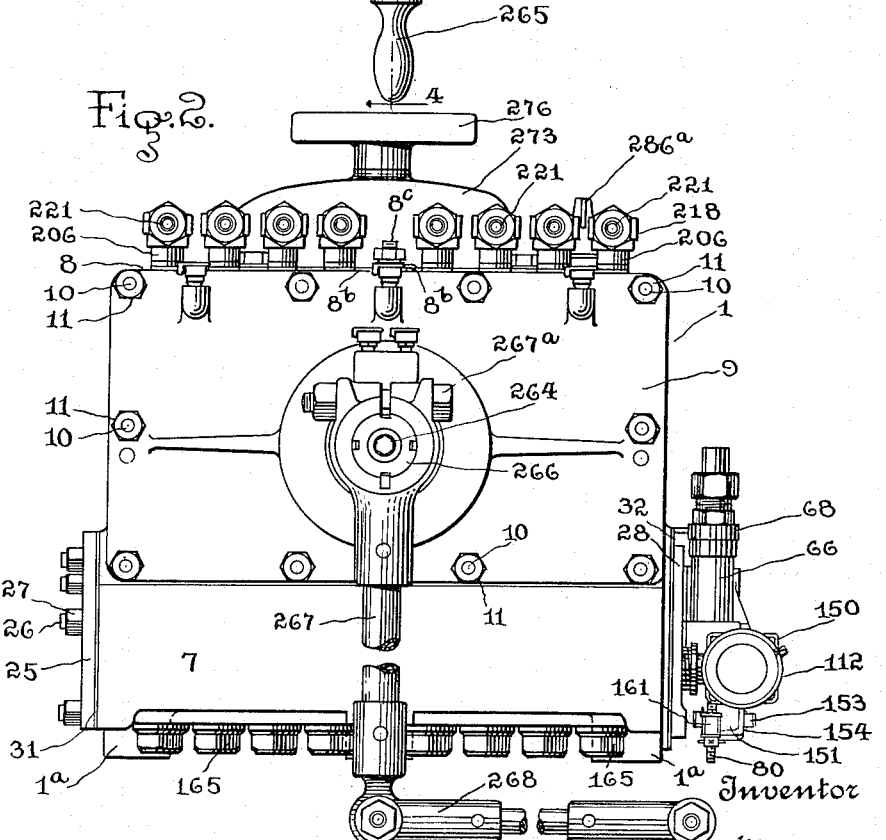
Fig. 2 is a front elevation thereof having the cover which encloses certain inlet valve mechanism removed.

The oil which is heated in the chamber 15 will filter through the screens 166 which may be of very fine mesh, as the oil being hottest adjacent them is also least viscous, and the screens will therefore effectively prevent foreign matter from entering the pumps 163 and clogging them. The pumps are operated by the engine to be lubricated by connection of the push rod 268 to a reciprocating engine part, which being connected to the lever 267 will cause it to oscillate and rotate sleeve 242 to which it is fixed. As the lever moves to the left of Fig. 2, the pawls 238 (Fig. 12) carried by plate 235 on sleeve 242, will engage the teeth 234 on the ratchet wheel 232 and rotate the shaft 228. Reverse movement of the wheel is prevented by the stop pawls 247 fixed to the cover plate 9. Rotating with shaft 228 is the eccentric 250 which rotates in the block 250a, reciprocating it from end to end of housing 253 and raising and lowering the block 250a and the plate 254 on its guide posts 256 to raise and lower the pump cylinders or casings 181. By means of the sliding block 250a the plate 254 receives only vertical motion from the eccentric 250. To prime the pumps, the hand crank 265 is rotated clockwise of Fig. 2, and as it is fixed on shaft 228 the cylinders 181 will be raised and lowered independently of the ratchet mechanism and through a complete cycle with each rotation of the crank. Assuming that the pumps have been primed so that they and the feed lines are filled with oil, then as the ratchet wheel 232 is rotated, step by step, the cylinders 181 will be raised slowly by the eccentric 250 and then be returned or lowered at the same rate to complete a cycle. On the upstroke of the cylinders, the pistons 202 will force the oil out of the cylinder bores 198a, but as it is checked against down or return flow by the valves 195, it must pass up through plunger bores 207 past the upwardly opening check valves 210 and into the feed lines (not shown) by way of nipples 221. On this same up-stroke, the cylinders 181 will raise on plungers 168, and the vacuum created thereby in cylinder bores 184a under the spring loaded valves 195, will suck oil from chamber 15 which has filtered through the screws 166 up past valves 179, 180 and through bores 171 into the cylinder bores 184a. When the cylinders or headers 181 reach the top of their upward stroke and start their downward or return stroke, the plungers 168 will move relatively upward in bores 184a, and the oil above these plungers 168 being trapped by the check valves 179, 180 will be forced past and above check valves 195. As was above stated the displacement of plungers 168 is substantially twice that of the plungers 202, and therefore substantially half the quantity of oil displaced by plungers 168 on the down stroke of the cylinders 181 will be forced through cylinder bores 198a and up through the plunger passages 207 into the feed lines (not shown) by way of nipples 221. The remaining half of the oil exhausted or forced out of cylinder bore 184a will remain in bore 198a until the up stroke of the cylinder 181 when it will also be forced into the feed lines as above described. It is therefore evident that the pumps 163 will feed oil or lubricant to the feed lines substantially continuously, and are in effect double acting pumps.

What I claim and desire to secure by Letters Patent of the United States is:—

1. A force feed lubricator, comprising a hollow casing having an oil storage chamber, an oil heating chamber, and a pump chamber therein, a passage between said storage chamber and said heating chamber, said storage chamber and said heating chamber each having an opening through said casing, a closure member for said openings, heater tubes adapted to receive a heating fluid and operatively connected to said member, certain of said tubes extending into said storage chamber adapted to maintain the oil therein fluid for flow through said passage to said heating chamber, certain other of said tubes extending into said heating chamber, conduit means connecting said tubes, an inlet to said tubes, a valve for said inlet, pump means in said pump chamber, an oil passage from said heating chamber to said pump means, an outlet from said pump means, and a thermostat carried by said closure member and operatively connected to said valve, said thermostat operating in response to the temperature of the oil in said heating chamber to open and close said valve to maintain the temperature of the oil fed from said heating chamber to said pump means substantially constant and above any possible rise of atmospheric temperature, whereby the oil discharge from said pump means is independent of variations in the viscosity of the oil which would normally result from atmospheric changes of temperature.

2. A force feed lubricator, comprising a hollow casing having an oil storage chamber and an oil heating chamber, said heating chamber having communication with said storage chamber, heater means for said storage chamber adapted to maintain the oil therein fluid for flow to said heating chamber, a pump, an oil conduit from said heating chamber to said pump, heater means for said heating chamber to heat the oil therein to a predetermined higher temperature than the maximum temperature of the oil in said storage chamber at which higher temperature the viscosity of the oil will be unaffected by atmospheric changes of temperature to maintain a substantially constant discharge from the pump, and means responsive to the temperature of the oil in said heating chamber to regulate said last-named heater means to prevent overheating of the oil in said heating chamber and to maintain the temperature of the oil in said heating chamber substantially constant at said predetermined temperature.

3. In a force feed lubricator, a hollow casing having an oil storage chamber and an oil heating chamber, a passage connecting said chambers, oppositely disposed openings through the walls of said storage chamber, a heater tube in said storage chamber adapted to receive a heating fluid, one end of said tube being sealed in one of said openings, the other end of said tube being closed and slidably supported in the other of said openings, a plug closing said one opening and having an inlet and an outlet passage therethrough, a valve to control said inlet passage, a heater tube extending into said heating chamber, a conduit connecting the tube in said heating chamber to said outlet passage, a thermostat having an expansion chamber carried by said casing and having a bulb operatively connected to said expansion chamber and extending into said heating chamber, an expansible-contractible fluid in said bulb and expansion chamber, and plunger means connecting said expansion chamber to said valve to close and open said valve respectively with the expansion and contraction of said fluid in response to the temperature of the oil in said casing.

4. In a force feed lubricator, a hollow casing having an oil storage chamber and an oil heating chamber, a passage connecting said chambers, oppositely disposed openings through the walls of said storage chamber, a heater tube in said storage chamber adapted to receive a heating fluid, one end of said tube being sealed in one of said openings, the other end of said tube being closed and slidably supported in the other of said openings, a plug closing said one opening and having an inlet and an outlet passage therethrough, a valve to control said inlet passage, a heater tube extending into said heating chamber, a conduit connecting the tube in said heating chamber to said outlet passage, a thermostat carried by said casing and responsive to the oil temperature in said casing, and a member connecting said thermostat and said valve and adapted to close said valve on expansion of said thermostat and to open said valve on contraction of said thermostat, said connecting member having safety means to permit overtravel of said connecting member after said valve has seated.

5. In a force feed lubricator, a hollow casing having an oil heating chamber therein, a plurality of heater tubes in said chamber, conduits connecting said tubes in series, an inlet for admission of heating fluid to one of said tubes, an outlet from said tubes, a valve casing having an inlet and an outlet, a conduit connecting said valve casing outlet to said heater inlet, said valve casing having a valve port therein, a valve in said casing adapted to close said port, a stem fixed to said valve and projecting through said valve casing, lever means operatively connected to said stem, a thermostat having a bulb in said chamber adjacent said tubes and having an expansion chamber outside said hollow casing and in communication with said bulb, an expansible-contractible fluid in said bulb and said expansion chamber, a resilient expansible-collapsible member sealing said expansion chamber, tubular plunger means fixed to said resilient member, said plunger means having an opening thereinto, said lever extending into said plunger opening, a lever engaging member in said tubular plunger means, and resilient means to maintain said engaging member in contact with said lever.

6. In a force feed lubricator, a hollow casing having an oil heating chamber therein, a conduit in heat-transmitting relation to said chamber and having an inlet and an outlet for the passage of heating fluid through said conduit, a valve adapted to open and close said inlet and having a valve stem, lever means operatively connected to said stem, a thermostat having a bulb in said chamber adjacent said conduit and having an expansion chamber outside said hollow casing and in communication with said bulb, an expansible-contractible fluid in said bulb and said expansion chamber, a resilient expansible-collapsible member sealing said expansion chamber, tubular plunger means fixed to said resilient member, said plunger means having an opening thereinto, said lever extending into said plunger opening, a lever engaging member in said tubular plunger means, and resilient means to maintain said engaging member in contact with said lever whereby expansion of said expansible fluid in response to a rise in temperature of the oil in said heating chamber will act through said plunger means to move said valve to close said inlet.

7. In a force feed lubricator, a hollow casing having an oil heating chamber, a conduit in heat-transmitting relation to said chamber and having an inlet and an outlet for the passage of heating fluid through said conduit, a valve adapted to open and close said inlet and having a valve stem, a thermostat responsive to the temperature of oil in said chamber, and resilient safety means operatively connecting said thermostat and said valve stem whereby movement of said thermostat moves said valve stem.

8. A device of the character described, comprising a casing having a lubricant-containing chamber therein, a conduit in heat-transmitting relation to said chamber, a valve casing having an inlet port and an outlet port communicating with said conduit, a valve in said valve casing adapted to open and close said inlet port to control flow of a heating medium through said conduit, a stem fixed to said valve and projecting through said first-named casing, a thermostat, and means connecting said thermostat and said valve stem, said means including a spring-held member adapted to permit overtravel of said thermostat after said thermostat has acted to move said valve to close said port.

9. In a device of the character described, a casing having a lubricant-containing chamber therein, a conduit in heat-transmitting relation to said chamber, a thermostat carried by said casing and responsive to the temperature of said chamber, said thermostat having a bulb and having an expansion chamber in communication with said bulb, said chamber having an open side, an expansible-collapsible member sealing said open side, a valve for controlling flow of a heating medium through said conduit, an abutment secured to said member and operatively connected to said valve, an expansible-contractible fluid in said bulb and said chamber, said abutment being movable with said member upon expansion and contraction of said fluid, a follower member operatively connected to said valve and adapted to engage said abutment, and resilient means normally holding said follower member in engagement with said abutment.

10. A force feed lubricator comprising an oil chamber having a filling opening, a pump for delivering oil from said chamber, said chamber having an opening in its side wall, closure means for said side wall opening, means clamping said closure means to said casing, a heating conduit supported by said closure means and extending into said chamber, and control means carried by said closure means and operable to control flow of heating fluid through said conduit.

11. A force feed lubricator comprising an oil chamber having a filling opening, a pump for delivering oil from said chamber, said chamber having an opening in its side wall, closure means for said side wall opening, means clamping said closure means to said casing, a heating element supported by said closure means and extending into said chamber, control means mounted on said closure means and operable to control the heating effect of said heating element, thermostatic means responsive to temperature of oil in said chamber, and means operatively connecting said thermostatic means to said control means.

12. A force feed lubricator comprising a casing including a main oil chamber and a heating chamber having communication with the main chamber to receive oil therefrom, a pump to deliver oil from said heating chamber, said chambers having openings, closure means for said openings, conduits for heating fluid supported by said closure means and extending into said chambers, said conduits being connected in series, and control means carried by said closure means and operable to control flow of heating fluid through said conduits.

13. A force feed lubricator comprising a casing including a main oil chamber and a heating chamber having communication with the main chamber to receive oil therefrom, said main oil chamber having a filling opening, a pump to deliver oil from said heating chamber, said heating chamber having an opening in its side wall, closure means for said side wall opening, a conduit for heating fluid supported by said closure means and extending into said heating chamber, control means carried by said closure means and operable to control flow of heating fluid through said conduit, a thermostat supported on said closure means and exposed to the temperature of the oil in said heating chamber, and means operatively connecting said thermostat to said control means.

14. A force feed lubricator comprising a casing including a main oil chamber and a heating chamber having communication with the main chamber to receive oil therefrom, a pump to deliver oil from said heating chamber, said chambers having openings, closure means for said openings, conduits for heating fluid supported by said closure means and extending into said chambers, control means carried by said closure means and operable to control flow of heating fluid through said conduits, a charged thermostatic bulb on said closure member and exposed to the temperature of the oil in said heating chamber, and pressure responsive means responsive to pressure generated in said bulb and acting on said control means to control flow of heating fluid through said conduits.

15. A force feed lubricator, comprising a hollow casing having partition means dividing said casing into an oil storage chamber, an oil heating chamber and a pump chamber, said heating chamber having communication with said storage chamber, a heater tube extending into said storage chamber, a heater tube extending into said heating chamber, a conduit connecting said tubes, an inlet conduit for supplying a heating medium to one of said tubes, an outlet conduit from the other of said tubes, and a pump supported in said pump chamber and having its inlet communicating with said heating chamber.

16. A force feed lubricator, comprising a hollow casing having partition means dividing said casing into an oil storage chamber, an oil heating chamber and a pump chamber, said heating chamber having communication with said storage chamber, a heater tube extending into said storage chamber, a heater tube extending into said heating chamber, an inlet conduit for supplying a heating medium to said tubes, a valve in said inlet conduit, a thermostat responsive to temperature of the oil in said heating chamber, means operatively connecting said thermostat to said valve, a plate member carried by said casing and rigidly supporting said second-named tube and said thermostat, and a pump supported in said pump chamber and having its inlet communicating with said heating chamber.

17. A force feed lubricator, comprising a hollow casing having a filling opening and an oil heating chamber therein, said heating chamber having an opening in its side wall, a plate member secured to said casing and closing said side wall opening, a heater tube carried by said plate member and extending into said chamber, a valve controlling flow of heating medium to said tube, a charged thermostatic bulb carried by said plate member and positioned in said chamber, pressure responsive means responsive to pressure generated in said bulb, and means operatively connecting said responsive means to said valve.

18. In a force feed lubricator, a hollow casing having an oil storage chamber and an oil heating chamber, a passage connecting said chambers, oppositely disposed openings through the walls of said storage chamber, a heater tube in said storage chamber adapted to receive a heating fluid, one end of said tube being sealed in one of said openings, the other end of said tube being closed and slidably supported in the other of said openings, an inlet passage and an outlet passage for said tube, a heater tube extending into said heating chamber, and a conduit connecting said last-named tube to said outlet passage.

19. In a force feed lubricator, a hollow casing containing an oil chamber having an opening in its side wall, a heater tube positioned in said chamber and having one end secured and sealed in said opening, means in said chamber slidably supporting the other end of said tube, an inlet passage communicating with said opening to supply heating fluid to said tube, a valve to control said inlet passage, a thermostat having an expansion chamber carried by said casing and having a bulb operatively connected to said expansion chamber, said bulb extending into said heating chamber, an expansible-contractible fluid in said bulb and said expansion chamber, and plunger means connecting said expansion chamber to said valve to close and open said valve respectively with the expansion and contraction of said fluid in response to the temperature of the oil in said oil chamber.

20. In a force feed lubricator for supplying lubricant to a moving part remote from the lubricator and wherein the temperature of the supplied lubricant is independent of and unaffected by the heat of the moving part, the combination of a hollow casing having a lubricant containing chamber, a pump supplied with lubricant from said chamber and operable to discharge the lubricant to the moving part, means to heat the lubricant contained in said chamber, said means being operable to heat the lubricant to a temperature at which the viscosity of the lubricant will be unaffected by atmospheric changes of temperature and remain substantially constant, thermostatic means responsive to the temperature of the heated lubricant, and a control valve operable by said thermostatic means to regulate heating of the lubricant whereby said thermostatic means acts to maintain the discharge from the pump constant irrespective of changes in atmospheric temperature.

ADOLF von WANGENHEIM.